US006674734B1

United States Patent
Hsu et al.

(10) Patent No.: US 6,674,734 B1
(45) Date of Patent: Jan. 6, 2004

(54) SCHEME TO RELOCATE H. 323 GATEKEEPER DURING A CALL WHEN ENDPOINT CHANGES ITS ZONE

(75) Inventors: Liangchi Hsu, Arlington, TX (US); Khiem Le, Coppell, TX (US); Stefano Faccin, Dallas, TX (US); Rene Purnadi, Coppell, TX (US); Rajeev Koodli, Natick, MA (US)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 09/351,131

(22) Filed: Jul. 12, 1999

(51) Int. Cl.$^7$ ................................................ H04Q 7/00
(52) U.S. Cl. ....................... 370/331; 370/352; 370/401; 455/436
(58) Field of Search ................................. 370/331–334, 370/340, 352, 493, 395.52, 338, 401; 455/436–442

(56) References Cited

U.S. PATENT DOCUMENTS 6,363,065 B1 * 3/2002 Thornton et al. ............ 370/352
6,424,638 B1 * 7/2002 Ray et al. .................... 370/331

FOREIGN PATENT DOCUMENTS

| EP | 0964560 | 12/1999 |
|----|---------|---------|
| WO | 9859467 | 12/1998 |

OTHER PUBLICATIONS

C. Perkins, *Mobile IP*, Sun Microsystems, IEEE Communications Magazine, May 1997, pp. 84–99.
W. Liao, Mobile Internet Telephony: mobile extensions to H.323, Department of Electrical Engineering National Taiwan University, 1999, pp. 12–19.

* cited by examiner

*Primary Examiner*—Nguyen T. Vo
*Assistant Examiner*—James Moore
(74) *Attorney, Agent, or Firm*—Antonelli, Terry, Stout & Kraus, LLP

(57) ABSTRACT

A method, computer program, and apparatus for allowing endpoints to move between zones of a packet-switched network. In the invention, a communication between local and remote endpoints are established via a first gatekeeper, which services a first zone of the packet-switched network, when the local endpoint is at a location serviced by the first zone of the packet-switched network. When the local endpoint moves to a location serviced by a second zone of the packet-switched network, subsequent to the initial hand-off, communication between the local and remote endpoints is maintained via the first gatekeeper and a second gatekeeper which services the second zone of the packet-switched network, by performing an initial hand-off communication control functions from the first gatekeeper to the second gatekeeper. When the local endpoint further moves to a location serviced by a third zone of the packet-switched network, communication between the local and remote endpoints is maintained via the first gatekeeper and a third gatekeeper, which services the third zone of the packet-switched network, by performing a subsequent hand-off of communication control functions from the second gatekeeper to the third gatekeeper.

18 Claims, 5 Drawing Sheets

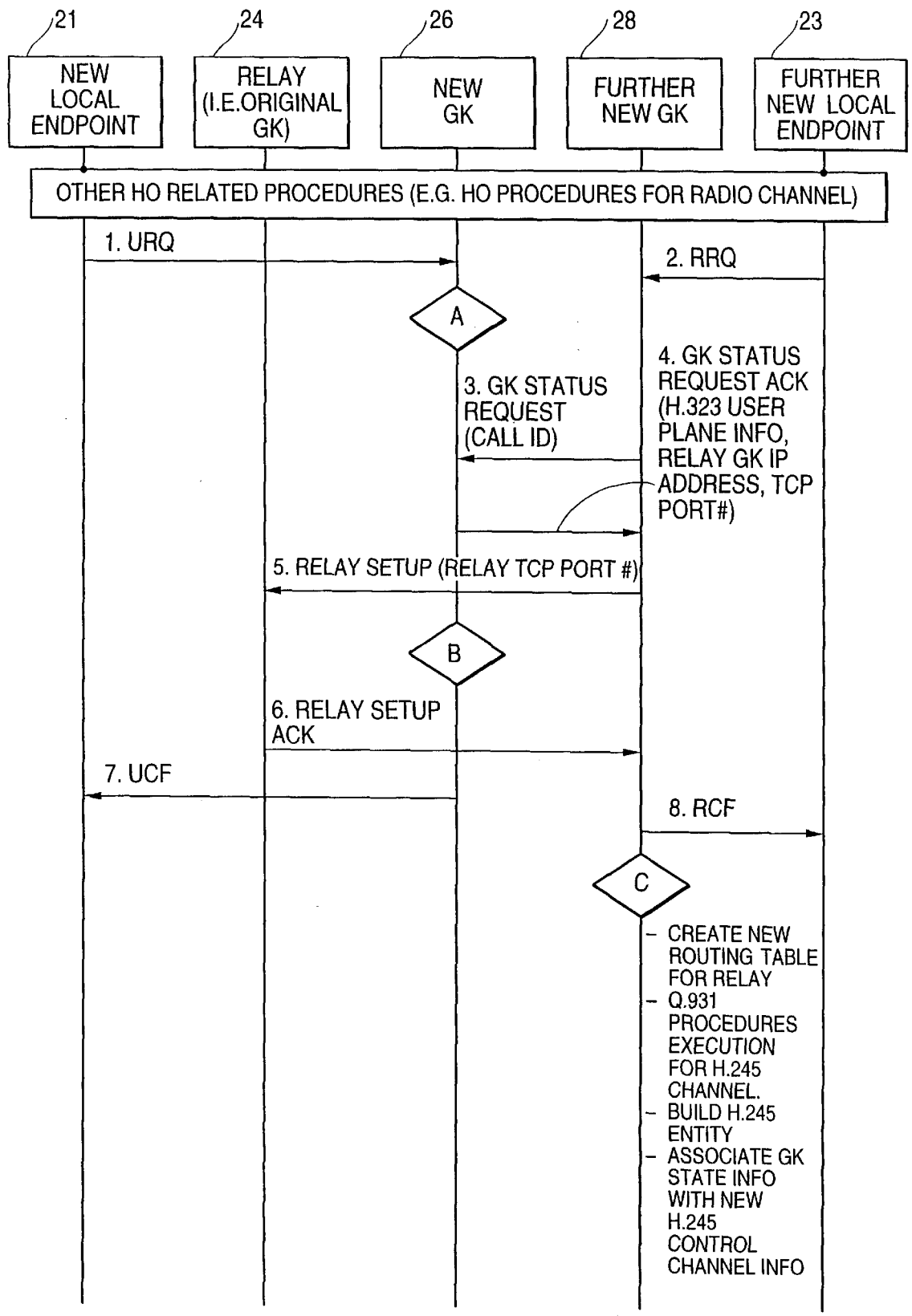

SCHEME TO RELOCATE H. 323 GATEKEEPER DURING A CALL WHEN ENDPOINT CHANGES ITS ZONE

BACKGROUND OF THE INVENTION

The present invention relates to packet-switched networks, such as Internet Protocol (IP) networks. More particularly, the present invention relates to a method, computer program and apparatus for allowing hand-off of an endpoint in a packet-switched network by allowing the relocation of a gatekeeper during a call when the endpoint moves to a different zone of the packet-switched network.

Voice or telephony services can now be provided over a packet-switched network, such as the Internet. These packet-switched networks are commonly referred to as IP networks, IP telephony networks or Voice over IP (VoIP) networks because the Internet protocol according to various IP based standards is the primary protocol used. One such IP based standard, for example, is the International Telecommunication Union (ITU) H.323 Standard.

The H.323 Standard provides a foundation for audio, video, and data communications across IP networks. By complying with the H.323 Standard, multimedia products and applications from multiple vendors can interoperate, allowing users to communicate without concern for compatibility. The H.323 Standard is part of a larger series of communications standards that enable audio video conferencing across a range of networks.

The H.323 standard defines four major components for a network based communications, namely terminals, gateways, gatekeepers and Multipoint Control Units (MCU).

Terminals are the client endpoints on the network that provide realtime two-way communications. All terminals which comply with the H.323 standard must also support the ITU H.245 standard, which is used to negotiate channel usage and capabilities. Further, terminals which comply with the H.323 standard are required to implement the ITU Q.931 and the H.225 standards for call signaling and call setup, including for Registration/Admission/Status (RAS) processing. Optional capabilities in terminals which comply with the H.323 standard are MCU capabilities.

The gateway is an optional element when implementing the H.323 standard. Each gateway provides many services the most common being a translation function between the H.323 standard conferencing endpoints and other terminal types. For example, this function could include translation between transmission formats and between communication procedures.

Gatekeepers are the most important component of an H.323 standard enabled network. It acts as a central point for all calls or communication within a zone serviced by the gatekeeper and provides call communication control services to registered endpoints. The gatekeeper could be considered a virtual switch. The gatekeeper performs four important call or communication control functions. The first is address translation from, for example, aliases for terminals and gateways to transport addresses. The second is admission control where the gatekeeper authorizes network access based on call authorization, bandwidth, or some other criteria. The third is bandwidth control which provides bandwidth management wherein the gatekeeper if necessary can refuse to make connections. The fourth is zone management where the gatekeeper provides each of the above noted functions for the terminals, MCU's, and gateways that have been registered in the zone serviced by the gatekeeper.

The MCU supports conferences between three or more endpoints. Under the H.323 standard an MCU includes a multipoint controller which handles H.245 standard negotiations between all terminals to determine common capabilities for audio and video processing, and possibly a multipoint processor which mixes, switches and processes audio, video and/or data bits.

Each of the above described endpoints, gateway, gatekeeper, and MCU can be implemented by use of apparatus such as a personal computer (PC), workstation, server, etc.

The above described H.323 standard as defined is intended to operate in fixed packet-switched networks where the endpoints, for example, terminals such as workstations, PC's, etc., that conform to the H.323 standard, do not move to a new zone serviced by another gatekeeper. As illustrated in FIG. 1, a packet-switched network which implements the H.323 standard can, for example, be organized into a plurality of zones 100a–n. Each zone 100, for example, could include a plurality of terminals 10a–n, a gatekeeper 12, at least one gateway 14, at least one router 16 and at least one MCU 18. Each of the routers 16a–n included in the packet-switched network interconnects, for example, sub-networks included in a zone 100 to each other, or interconnects, for example, zones of the packet-switched network included in different zones of the packet-switched network 100a–n to each other.

The packet-switched network illustrated in FIG. 1 implementing current IP standards, including the H.323 standard does not allow for the roaming or mobility of the endpoint during a call or communication. Thus, for example, the terminals 10a–e cannot roam or be mobile among the zones 100a–n in the packet-switched network while a call or communication is being conducted. For example, such roaming or mobility is important if, for example, the endpoint (terminal) is implemented by a mobile telephone, laptop, Personal Communications Services (PCS) device, etc., which comply with the H.323 standard.

Therefore, there exists a need for a technique that allows endpoints implementing the H.323 standard to be able to roam or have mobility between different zones, networks or sub-networks of a packet-switched network.

SUMMARY OF THE INVENTION

The present invention provides a method, computer program and apparatus for allowing hand-off of an endpoint in a packet-switched network enabled by the H.323 standard by allowing the relocation of a gatekeeper during a call when the endpoint moves to a different section of the packet-switched network.

Particularly, the present invention provides a technique of allowing endpoints to move between different zones of a packet-switched network while maintaining communications already established with another endpoint. The present invention accomplishes this by establishing a communication between local and remote endpoints via a first gatekeeper, which services a first zone of the packet-switched network, when the local endpoint is at a location serviced by the first zone of the packet-switched network. The local endpoint is mobile and can be, for example, a device such as a wireless telephone, laptop computer, PCS device, etc. When the local endpoint moves to a location serviced by a second zone of the packet-switched network, the communication is maintained between the local and remote endpoints via the first and second gatekeepers. The second zone of the packet-switched network is serviced by the second gatekeeper.

The communication between the local and remote endpoints via the first and second gatekeepers is maintained by causing communication control functions previously performed by the first gatekeeper to be handed-off to the second gatekeeper. After such initial hand-off, the first gatekeeper relays communications between the remote endpoint and the second gatekeeper, and the second gatekeeper relays communications between the first gatekeeper and the local endpoint and performs communication control functions on communications between the local and remote endpoints. Thus, the present invention provides that when the local endpoint moves to a location serviced by a second gatekeeper, and after an initial hand-off the first gatekeeper performs primarily a relaying function and the second gatekeeper performs a relaying function and communication control functions between the local and remote endpoints.

The present invention also provides a technique for maintaining communication between the local and remote endpoints when the local endpoint moves, subsequent to the above described move, to a location serviced by a third zone of the packet-switched network. The third zone of the packet-switched network is serviced by a third gatekeeper. Communication between the local and remote endpoints is maintained by causing communication control functions previously performed by the second gatekeeper to be handed-off to the third gatekeeper. After such subsequent hand-off, the first gatekeeper relays communications between the remote endpoint and the third gatekeeper, rather than the second gatekeeper, and the third gatekeeper relays communications between the first gatekeeper and the local endpoint and performs communication control functions on communications between the local and remote endpoints. Thus, the present invention provides that when the local endpoint moves, subsequent to the above describe move, to a location serviced by a third gatekeeper, and after a subsequent hand-off, the first gatekeeper performs primarily a relaying function and the third gatekeeper performs a relaying function and communication control functions between the local and remote endpoints.

In the present invention, the above described technique for maintaining communication between the local and remote endpoint when the local endpoint moves, subsequent to an initial move, to a location serviced by a third zone of the packet-switched network can be applied to any further subsequent moves of the local endpoint to a location serviced by a further zone of the packet-switched network. The further zone of the packet-switched network is serviced by a further gatekeeper. Communication between the local and remote endpoints is maintained by causing the communication control functions previously performed by the third gatekeeper to be hand-off to the further gatekeeper. After such further subsequent hand-off, the first gatekeeper relays communications between the remote endpoint and the further gatekeeper, rather than the third gatekeeper. The further gatekeeper relays communications between the first gatekeeper and the local endpoint and performs communication control functions on communications between the local and remote endpoints.

BRIEF DESCRIPTION OF THE DRAWINGS

The scope of the present invention will be apparent from the following detailed description, when taken in conjunction with the accompanying drawings, and such detailed description and specific examples, while indicating preferred embodiments of the invention, are given by way of illustration only, since various changes and modifications within the spirit and scope of the invention will become apparent to those skilled in the art from this detailed description, in which:

FIG. 5 is a diagram illustrating procedures performed to accomplish the subsequent hand-off according to the present invention.

DETAILED DESCRIPTION OF THE INVENTION

Figure 1:
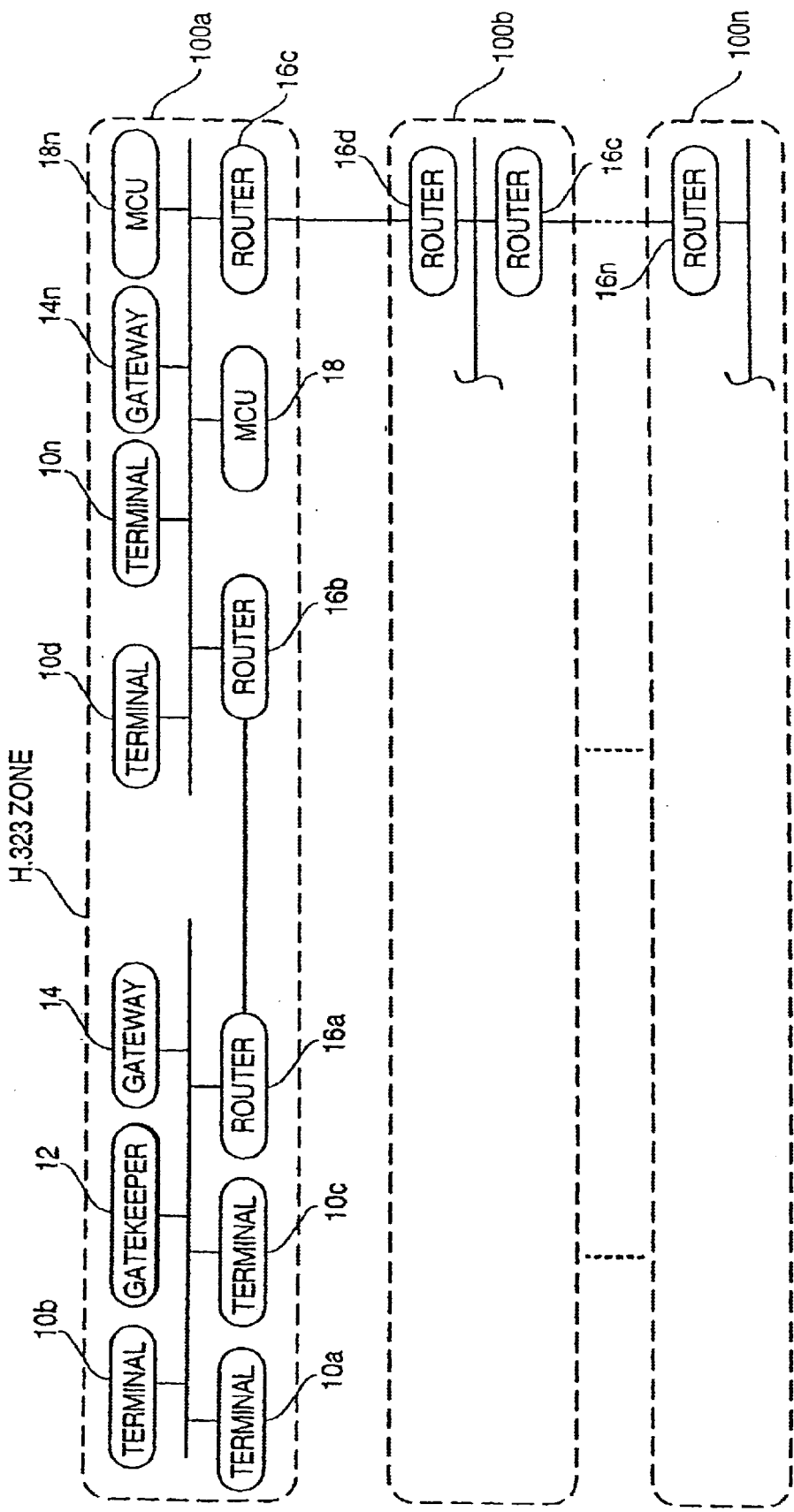
FIG. 1 is a schematic diagram illustrating a conventional packet-switched network having a plurality of zones.

The present invention provides a method, computer program and apparatus for allowing hand-off mobility, particularly hand-off, of an endpoint in a packet-switched network by allowing the relocation of a gatekeeper during a call when the endpoint moves to a different zone of the packet-switched network.

The present invention provides for the establishment of a communication between local and remote endpoints via a first gatekeeper, which services a first zone of a packet-switched network, when the local endpoint is at a location serviced by the first zone of the packet-switched network. As per the H.323 standard the first gatekeeper performs communication control functions according to the H.245 standard on communications between the local and remote endpoints, when the local endpoint is at a location serviced by the first zone of the packet-switched network, and when communication has been established between the local and remote endpoints. The local endpoint is mobile and can be, for example, a device such as a wireless telephone, laptop computer, PCS device, etc.

When the local endpoint moves to a location serviced by a second zone of the packet-switched network, the present invention causes the communication control functions, previously performed by the first gatekeeper, to be initially hand-off to a second gatekeeper which services the second zone of the packet-switched network. After such initial hand-off, communication between the local and remote endpoints is maintained by causing the first gatekeeper to relay communications between the remote endpoint and the second gatekeeper, and causing the second gatekeeper to relay communications between the first gatekeeper and the local endpoint and perform communication control functions on communications between the local and remote endpoints.

When the local endpoint moves, subsequent to the above described move to a second zone serviced by the second gatekeeper, to a location serviced by a third zone of the packet-switched network, the present invention causes the communication control functions, previously performed by the second gatekeeper, to be subsequently hand-off to a third gatekeeper. The third gatekeeper services the third zone of the packet-switched network. After such subsequent hand-off, communications between the local and remote endpoint is maintained by causing the first gatekeeper to relay communications between the remote endpoint and the third gatekeeper, excluding the second gatekeeper, and causing the third gatekeeper to relay communications between the first gatekeeper and the local endpoint and perform communication control functions on communications between the local and remote endpoints.

The present invention is intended to operate in a packet-switched network which can, for example, include IP telephony networks or VoIP networks which implement the H.323 standard. The H.323 standard as currently defined is for fixed networks where, for example, endpoints are not allowed to move. Thus, allowing for the mobility, particularly hand-off, of endpoints among the zones of the packet-switched network has not been provided in the current H.323 standard. The present invention satisfies this need by providing a technique that allows endpoints, such as wireless telephones, laptop computers, PCS devices, etc., implementing the H.323 standard, to have mobility, particularly hand-off, between different zones, or sub-networks of a packet-switched network.

The procedures performed by the present invention prior to and after the initial hand-off will be described using the illustration of the present invention in FIG. 2. The initial hand-off will be described below using the illustration of the present invention in FIG. 3.

Figure 2:
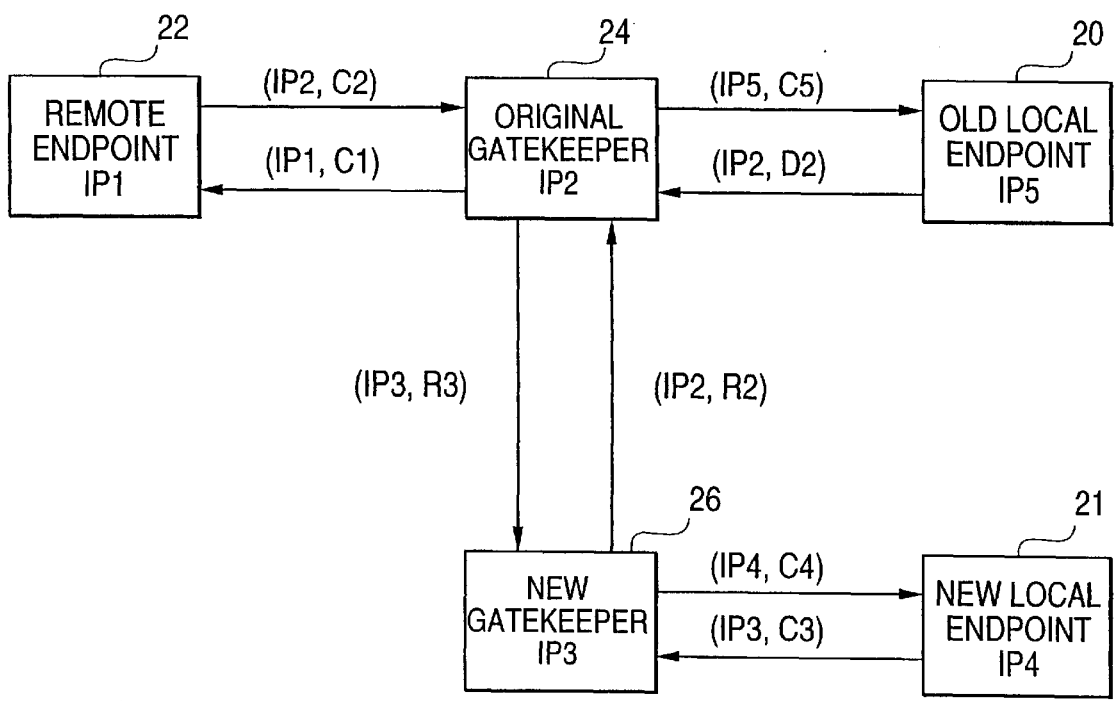
FIG. 2 is a schematic diagram illustrating a technique for allowing mobility of an endpoint in a packet-switched network after an initial hand-off according to the present invention.

As illustrated in FIG. 2, the present invention provides an old local endpoint 20 having an IP address IP5, a remote endpoint 22 having an IP address IP1, and an original gatekeeper 24 having an IP address IP2. The local endpoint 20 is mobile and can be, for example, a device such as a wireless telephone, laptop computer, PCS device, etc. Prior to the initial hand-off, and when communications between the local endpoint 20 and the remote endpoint 22 has been established, the original gatekeeper 24 operates in the normal manner according to the H.323 standard. Namely, the original gatekeeper 24 performs communication control functions according to the H.245 standard on communications between the old local endpoint 20 and the remote endpoint 22.

It should be noted with respect to each of FIGS. 2–5, IPX corresponds to an IP address and DX, CX, RX, correspond to TCP or UDP port numbers. Further, it should be noted that the IP addresses of each of the elements illustrated in FIGS. 2–5 particularly the old local endpoint 20 and the new local endpoint 21 can be different.

When the original gatekeeper 24 is operated normally and a communication has been established between the old local endpoint 20 and the remote endpoint 22, the remote endpoint 22 can send a message to the old local endpoint 20 via the original gatekeeper 24 at IP2, C2. The original gatekeeper 24 controls communications, namely the call between the remote endpoint 22 and the local endpoint 20, using the H.245 standard. Thus, in response to the message at IP2, C2 from the remote endpoint 22, the original gatekeeper 24 transmits a message according to the H.245 standard to the old local endpoint 20 at IP5, C5. The old local endpoint 20 can also send a message to the remote endpoint 22 via the original gatekeeper 24 at IP2, D2. The original gatekeeper 24, in response to the message from the old endpoint 20 at IP2, D2, and according to the H.245 standard, transmits a message to the remote endpoint 22 at IP1, C1.

Thus, when the gatekeeper 24 operates normally communications can be established between the old local endpoint 20 and the remote endpoint 22. Such is provided for in the H.323 standard. The control of communications is accomplish according to the H.245 standard.

However, when the old local endpoint 20 moves to a new location, which is illustrated in FIG. 2 by the new local endpoint 21, and after the initial hand-off has been conducted, the original gatekeeper 24 operates differently according to the present invention. Particularly, the original gatekeeper 24 now performs a relay function and the communication control functions previously performed by the original gatekeeper 24 are initially hand-off to a new gatekeeper 26. The new gatekeeper 26 services the zone of the packet-switched network at which the new local endpoint 21 is now positioned. The initial hand-off of the communication control functions from the original gatekeeper 24 to the new gatekeeper 26 may include various operations such as, for example, procedures for changing radio channels, registering new IP addresses, changing routing tables, etc. These procedures will be described below with respect to FIG. 3.

After the initial hand-off is performed, as per the above, the original gatekeeper 24 performs a relay function so as to relay all messages between the remote endpoint 22 and the new local endpoint 21 via the new gatekeeper 26. Specifically, the original gatekeeper 24 relays messages between the remote endpoint 22 and the new gatekeeper 26. Thus, as illustrated in FIG. 2, a message sent from the remote endpoint 22 at IP2, C2 is relayed by the original gatekeeper 24 to the new gatekeeper at IP3, R3. Further, as illustrated in FIG. 2, a message sent from the new gatekeeper 26 at IP2, R2 is relayed by the original gatekeeper 24 to the remote endpoint 22 at IP1, C1.

The new gatekeeper 26 also performs a relay function so as to relay all messages between the new local endpoint 21 and the remote endpoint 22 via the original gatekeeper 24. Specifically, the new gatekeeper 26 relays messages between the new local endpoint 21 and the original gatekeeper 24. Thus, as illustrated in FIG. 2, a message sent from the new local endpoint at IP3, C3 is relayed by the new gatekeeper 26 to the original gatekeeper at IP2, R2. Further, as illustrated in FIG. 2, a message sent from the original gatekeeper 24 at IP3, R3 is relayed by the new gatekeeper 26 to the new local endpoint 21 at IP4, C4.

According to the present invention, in addition to performing the above described relay function the new gatekeeper 26 operates in a manner similar to the operations previously performed by the original gatekeeper 24 before the initial hand-off. Particularly, for example, the new gatekeeper 26 performs communication control functions according to the H.245 standard on communications between the local and remote endpoints previously performed by the original gatekeeper 24.

Figure 3:
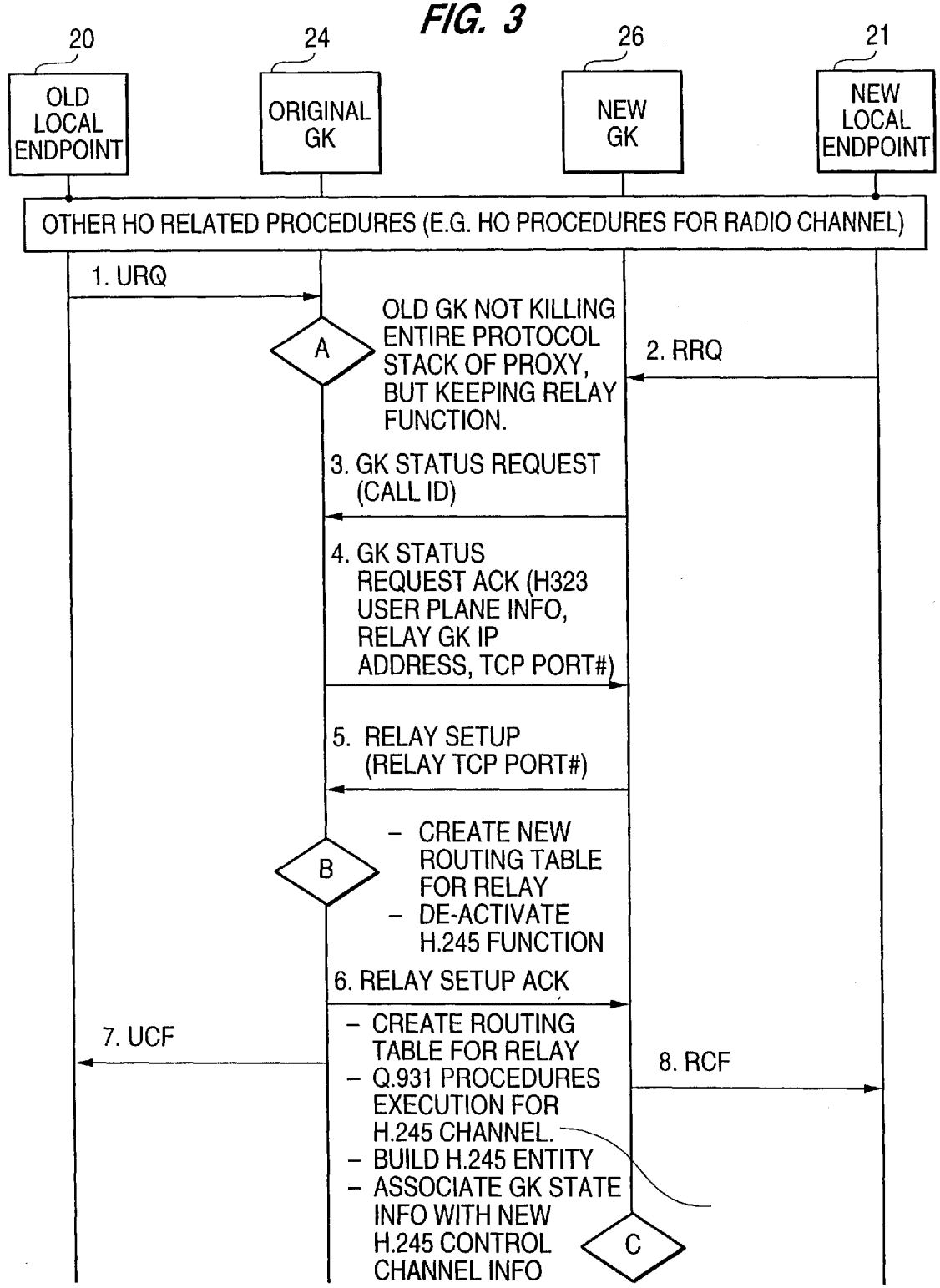
FIG. 3 is a diagram illustrating procedures performed to accomplish the initial hand-off according to the present invention.

The details of the procedures performed by the present invention to effect the initial hand-off are illustrated in FIG. 3. As shown in FIG. 3 various hand-off related procedures are performed when the old local endpoint 20 moves to the new local endpoint 21 location. These hand-off related procedures could, for example, include procedures for changing radio channels, etc.

After the hand-off related procedures are performed, the old local endpoint 20 transmits an un-register request (URQ) to the original gatekeeper 24 requesting that the registration of the old local endpoint 20 be removed. The URQ message can, for example, be a special URQ message which causes the removal of registration of the mobile local endpoint without completely destroying the protocol stack which is used for performing relaying functions. If a special URQ message is used to effect the above described function, then a non-special URQ message causes the removal of registration of the mobile endpoint and a complete destroying of the protocol stack. The original gatekeeper 24, in response to the special URQ message, performs a step A which, for example, includes removing registration of the old local endpoint 20 by modifying the protocol stack without completely destroying it. The remaining information is used to effect the relaying function. Also the original gatekeeper 24, in response to the special URQ message, disables its communication control functions as described below.

The new local endpoint 21, when located at another zone of the packet-switched network serviced by the new gatekeeper 26, sends a register request (RRQ) message to the new gatekeeper 26. The RRQ message, can, for example, be a special RRQ message which causes the registration of the local endpoint as a mobile local endpoint previously located in another zone of the packet-switched network serviced by another gatekeeper. If a special RRQ message is used to effect the above described function, then a non-special RRQ message causes the registration of an endpoint to be located in the zone of the packet-switched network and serviced by the gatekeeper servicing the zone of the packet-switched network.

By using the gatekeeper discovery scheme, the new gatekeeper 26 discovers the address information, for example, IP address and port number of the original gatekeeper 24. The new gatekeeper 26 sends a gatekeeper. (GK) status request message, formed using call identification (ID) information of the call between the local and remote endpoints, to the original gatekeeper 24. The original gatekeeper 24, in response to the GK status request message sends a gatekeeper (GK) status request acknowledgment (ACK) message, which includes GK state information according to the H.323 standard having, for example, user plane information (U state information), relay gatekeeper IP address, TCP port number, etc., to the new gatekeeper 26. The user plane information indicates the plane upon which the call between the local and remote endpoints is being conducted, the relay gatekeeper IP address indicates the IP address of the original gatekeeper 24 since it will serve primarily a relay function, and the TCP port number indicates the port number at the original gatekeeper 24 which received messages from the old local endpoint 20.

The new gatekeeper 26 in response to the GK status request ACK message transmits a relay setup message indicating a relay TCP port number to the original gatekeeper 24. Based on such information the original gatekeeper 24 performs a step B which, for example, includes creating a new routing table to accomplish the relay function and deactivating its communication control functions.

Thereafter, the original gatekeeper 24 sends a relay setup ACK message to the new gatekeeper 26 and sends an un-register confirmation (UCF) message to the old local endpoint 20. The UCF message can, for example, be a special UCF message which confirms the removal of the registration of the old local endpoint 20 from the original gatekeeper 24 which services the zone of the packet-switched network to which the old local endpoint 20 was connected. Particularly, the special UCF message recognizes that the registration for the old local endpoint 20 was a registration of a mobile local endpoint. If a special UCF message is used to effect the above described function, then a non-special UCF message confirms the removal of registration of the mobile local endpoint. The new gatekeeper 26 sends a register confirmation (RCF) message to the new local endpoint 21. The RCF message can, for example, be a special RCF message which confirms the registration of the new local endpoint 21 in the new gatekeeper 26 which services the zone of the packet-switched network to which the new local endpoint 21 is now connected. Particularly, the special RCF message confirms the registration of a mobile local endpoint. If a special RCF message is used to effect the above described function, then a non-special RCF message confirms the registration of a mobile local endpoint. The new gatekeeper 26 then performs a step C which, for example, includes creating a routing table for accomplishing the relay function, and executing Q.931 procedures to setup new channels implemented according to the H.225 and H.245 standards between the remote endpoint 22 and the new local endpoint 21, via the new gatekeeper 26. Step C performed by the new gatekeeper 26, could also include associating GK state information with the new H.245 standard implemented channels, and copying the U state information into a new H.245 standard implemented control entity.

As a result of the above described initial hand-off procedures illustrated in FIG. 3, communications are maintained between the new local endpoint 21 and remote endpoint 22 through the original gatekeeper 24 and the new gatekeeper 26 such that the original gatekeeper 24 performs a relay function and the new gatekeeper 26 performs the communication control functions.

Figure 4:
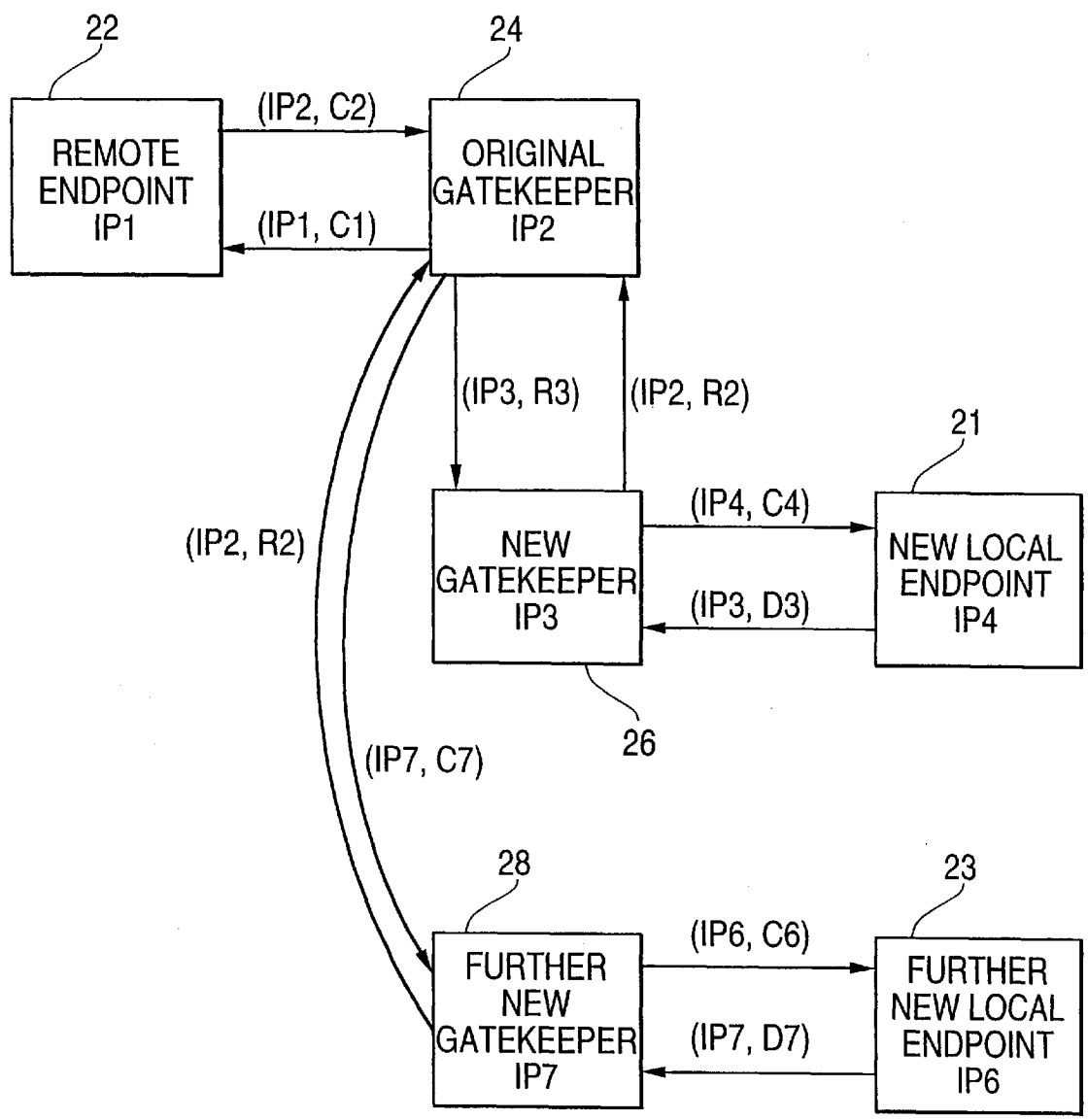
FIG. 4 is a schematic diagram illustrating a technique for allowing mobility, particularly hand-off, of an endpoint in a packet-switched network after a subsequent hand-off subsequent to an initial hand-off according to present invention.

The present invention also provides a technique where communications between the remote and local endpoints are maintained even if the new local endpoint 21 moves to a subsequent or new location at a further new local endpoint 23, within another zone of the packet-switched network serviced by a further new gatekeeper 28. Such is illustrated in FIG. 4. Procedures performed by the present invention prior to and after the subsequent hand-off, which occurs after the initial hand-off, will be described using the illustration of the present invention in FIG. 4. The procedures performed by the present invention to effect the subsequent hand-off will be described using the illustration of the present invention in FIG. 5.

FIG. 4, is similar to FIG. 2 with the exception of the further new local endpoint 23 having an IP address IP6, and the further new gatekeeper 28 having an IP address IP7.

As illustrated in FIG. 4, prior to the subsequent hand-off, the original gatekeeper 24 and the new gatekeeper 26 perform the same functions such as that described above and illustrated in FIG. 2 after the initial hand-off. Namely, the original gatekeeper 24 performs a relay function between the remote endpoint 22 and the new gatekeeper 26, and the new gatekeeper 26 performs a relay function between the original gatekeeper 24 and the new local endpoint 21 and performs communication control functions between the new local endpoint 21 and the remote endpoint 22. However, when the new local endpoint 21 moves to a further new location illustrated by the further new endpoint 23 in FIG. 4, the subsequent hand-off procedures are performed to hand-off the communication control functions, previously performed by the new gatekeeper 26, to the further new gatekeeper 28. As a result of the subsequent hand-off the communication established between the remote and local endpoints is maintained via the original gatekeeper 24 and the further new gatekeeper 28.

After, the subsequent hand-off is performed, the original gatekeeper 24 and the further new gatekeeper 28 operate as follows. Namely, the original gatekeeper 24 performs a relay function so as to relay all messages between the remote endpoint 22 and the further new local endpoint 23 via the further new gatekeeper 28, excluding the new gatekeeper 26. Specifically, the original gatekeeper 24 relays messages between the remote endpoint 22 and the further new gatekeeper 28, excluding the new gatekeeper 26. Thus, as illustrated in FIG. 4, a message sent from the remote endpoint 22 at IP2, C2, is relayed by the original gatekeeper 24 to the further new gatekeeper 28 at IP7, C7. Further, as illustrated in FIG. 4, a message sent from the further new gatekeeper 28 at IP2, R2 is relayed by original gatekeeper 24 to the remote endpoint 22 at IP1, C1.

The further new gatekeeper 28 also performs a relay function so as to relay all messages between the further new local endpoint 23 and the remote endpoint 22 via the original gatekeeper 24. Specifically, the further new gatekeeper 28 relays messages between the original gatekeeper 24 and the further new local endpoint 23. Thus, as illustrated in FIG. 4, a message sent from the further new local endpoint at IP7, D7 is relayed by the further new gatekeeper 28 to the original gatekeeper 24 at IP2, R2. Further, as illustrated in FIG. 4, a message sent from the original gatekeeper 24 at IP7, C7 is relayed by the further new gatekeeper 28 to the further new local endpoint 23 at IP6, C6.

According to the present invention, in addition to performing the above described relay function the further new gatekeeper 28 operates in a manner similar to the operations previously performed by the new gatekeeper 26 after the initial hand-off but prior to the subsequent hand-off. Particularly, for example, the further new gatekeeper 28 performs communication control functions according to the H.245 standard on communications between the local and remote endpoints previously performed by the new gatekeeper 26.

The details of the procedures performed by the present invention to effect the subsequent hand-off are illustrated in FIG. 5. The subsequent hand-off procedures illustrated in FIG. 5 are similar to the initial hand-off procedures illustrated in FIG. 3. The primary difference being that in the subsequent hand-off, the communication control functions previously performed by the new gatekeeper 26 are hand-off to the further new gatekeeper 28, whereas in the initial hand-off, the communication control functions previously performed by the original gatekeeper 24 are hand-off to the new gatekeeper 26.

The details of the subsequent hand-off procedures are as follows. As illustrated in FIG. 5 after the hand-off related procedures are performed, the new local endpoint 21 sends a special URQ message to the new gatekeeper 26. The new gatekeeper 26, in response to the special URQ message, performs step A as described above including, for example, removing registration of the new local endpoint 21 by modifying the protocol stack without completely destroying it. The remaining information will be used to effect the relaying function. The new gatekeeper 26 also disables its communication control functions in response to the special URQ message as described below.

Next the further new endpoint 23, when located at another zone of the packet-switched network serviced by the further new gatekeeper 28, sends a special RRQ message to the further new gatekeeper 28 requesting that the further new local endpoint 23 be registered. The further new gatekeeper 28 then sends a GK status request message using the call ID information of the call between local and remote endpoints to the new gatekeeper 26. The new gatekeeper 26, in response to the GK status request message, sends a GK status request ACK message which includes GK state information according to the H.323 standard having, for example, user plane information, relay gatekeeper IP address, TCP port number, etc., to the further new gatekeeper 28. The further new gatekeeper 28 upon receipt of the GK status request ACK message stores such information and then sends a relay setup message including the relay TCP port number to the original gatekeeper 24.

The new gatekeeper 26 after sending the GK status request ACK message performs a step B which, for example, includes deactivating its relay and communication control functions. Thus, the new gatekeeper 26 is dismissed from the call between the remote and local endpoints. When the new gatekeeper 26 is dismissed, the protocol stack is not completely destroyed. The new gatekeeper 26 then sends a special UCF message to the new local endpoint 21 using the remaining information of the protocol stack.

Thereafter, the further new gatekeeper 28, in response to relay setup ACK message from the original gatekeeper 24, sends a special RCF message to the further new local endpoint 23 and performs step C as described above including, for example, creating a new routing table for conducting the relaying operation, executing Q.931 standard procedures to setup new channels implemented according to the H.245 standard between remote endpoint 22 and the further new local endpoint 23 via the further new gatekeeper 28, associating the GK status information with the new H.245 implemented channels, and copying the U state information into the new H.245 standard implemented control entity As a result of the above described subsequent hand-off procedures illustrated in FIG. 5, communications are maintained between the remote endpoint 22 and the further new local endpoint 23 through the original gatekeeper 24 and the further new gatekeeper 28 such that the original gatekeeper 24 performs a relay function and the further new gatekeeper 28 performs the communication control functions.

The technique of the present invention, particularly that illustrated in FIGS. 4 and 5 allows for communications to be maintained between the remote and local endpoints even when the further new local endpoint 23 moves to a further subsequent or further new location. In order to maintain such communications, the present invention implements procedures such as that illustrated in FIG. 5, wherein the further new gatekeeper 28 performs functions same as the new gatekeeper 26. Specifically, the relaying and communication control functions of the further new gatekeeper 28 are deactivated and the further new gatekeeper 28 is dismissed from the call between the remote and local endpoints. Thereafter, an even further new gatekeeper (not shown) registers the even further new local endpoint (not shown), performs a relaying function between the original gatekeeper and the even further new local endpoint, and performs communication control functions between the remote endpoint and the even further new local endpoint. The hand-off procedures to effect this operation is, for example, such as that illustrated in FIG. 5 wherein the new gatekeeper 26 is now the further new gatekeeper 28 and the further new gatekeeper 28 is now the even further new gatekeeper. Also the new local endpoint 21 is now the further new local endpoint 23, and the further new local endpoint 23 is replaced by an even further new local endpoint.

According to the above described features, the present invention provides an apparatus, wherein a mobile local endpoint can freely move throughout a packet-switched network and still maintain communications with a remote endpoint even if the mobile local endpoint successively moves to successively different zones of the packet-switched network.

Therefore, according to the present invention as described above, a technique is provided for allowing endpoints to move between zones of a packet-switched network. The technique allows for a communication to be established between local and remote endpoints via a first gatekeeper which services a first zone of the packet-switched network, when the local endpoint is at a location serviced by the first zone of the packet-switched network. The local endpoint is mobile and can be, for example, a device such as a wireless telephone, laptop computer, PCS device, etc. The technique also allows communication between the local and remote endpoints to be maintained via the first gatekeeper and a second gatekeeper, which services a second zone of the packet-switched network, when the local endpoint moves to a location serviced by the second zone of the packet-switched network. The technique of the present invention further allows communication between the local and remote endpoints to be maintained when the local endpoint further moves to a location serviced by a third zone of the packet-switched network, wherein the third zone of the packet-switched network is serviced by a third gatekeeper.

The above described technique of the present invention can be implemented, for example, by a computer program operating in each gatekeeper implemented according to the H.323 standard or by apparatus provided in each gatekeeper. The computer program implementing the technique of the present invention could, for example, include code or sections of code that when executed causes a computer or other similar apparatus to perform steps such as that illustrated in FIGS. 2–5. The apparatus implementing the technique of the present invention could, for example, include various elements which implement the functions and procedures illustrated in FIGS. 2–5.

The computer program could, for example, be stored on a storage medium such as floppy disk, CD Rom, memory device, etc., and installed on apparatus used to implement the functions of a gatekeeper. The computer program could also be stored in the ROM of the apparatus implementing the functions of a gatekeeper. Further, the computer program could, for example, be provided to the apparatus implementing the functions of a gatekeeper by a network such as a LAN or Internet connected to the apparatus.

Therefore, according to the description above, the present invention when set forth in a packet-switched network implemented according to the H.323 standard, allows for mobility, particularly hand-off, of an endpoint in the packet-switched network by allowing the relocation of a gatekeeper during a call when the endpoint moves to a different zone of the packet-switched network.

While the present invention has been described in detail and pictorially in the accompanying drawings, it is not limited to such details since many changes and modification recognizable to these of ordinary skill in the art having the benefit of this invention may be made to the invention without departing from the spirit and scope of the invention, and all such modifications as would be obvious to one skilled in the art and/or which become possible as technology develops, are intended to be included within the scope of the following claims.

We claim:

1. A method of allowing endpoints to move between different zones of a packet-switched network, comprising:

establishing a communication between local and remote endpoints via a first gatekeeper, which services a first zone of the packet-switched network, when said local endpoint is at a location serviced by said first zone of the packet-switched network;

maintaining communication between said local and remote endpoints via said first gatekeeper and a second gatekeeper, which services a second zone of the packet-switched network, when said local endpoint moves to a location serviced by said second zone of the packet-switched network;

maintaining communication between said local and remote endpoints via said first gatekeeper and a third gatekeeper, which services a third zone of the packet-switched network, when said local endpoint moves to a location serviced by said third zone of the packet-switched network;

handing-off communication control functions from said second gatekeeper to said third gatekeeper, when said local endpoint moves to said third zone of said packet-switched network serviced by said third gatekeeper;

relaying, by said first gatekeeper, communications between said remote endpoint and said third gatekeeper;

relaying, by said third gatekeeper, communications between said first gatekeeper and said local endpoint; and performing, by said third gatekeeper, communication control functions, previously performed by said second gatekeeper, on communications between said local and remote endpoints.

2. A method according to claim 1, wherein said first maintaining step comprises the step of:

handing-off communication control functions from said first gatekeeper to said second gatekeeper, when said local endpoint moves to said second zone of said packet-switched network serviced by said second gatekeeper.

3. A method according to claim 2, wherein said first maintaining step further comprises the steps of:

relaying, by said first gatekeeper, communications between said remote endpoint and said second gatekeeper;

relaying, by said second gatekeeper, communications between said first gatekeeper and said local endpoint; and performing, by said second gatekeeper, communication control functions, previously performed by said first gatekeeper, on communications between said local and remote endpoints.

4. A method according to claim 3, wherein each endpoint implements the H.323 standard.

5. A method according to claim 3, wherein said communication control functions are performed according to the H.245 standard.

6. A method according to claim 2, wherein each endpoint implements the H.323 standard.

7. A method according to claim 2, wherein said communication control functions are performed according to the H.245 standard.

8. A method according to claim 1, wherein each endpoint implements the H.323 standard.

9. A method according to claim 1, wherein when said local endpoint is at the location serviced by said first zone of the packet-switched network, communication control functions between said local and remote endpoints are performed by said first gatekeeper, and wherein when said local endpoint moves to the location serviced by said second zone of the packet-switched network, communication control functions between said local and remote endpoints are performed by said second gatekeeper.

10. A method according to claim 9, wherein said communication control functions are performed according to the H.245 standard.

11. A method according to claim 1, wherein when said local endpoint is at the location serviced by said second zone of the packet-switched network, communication control functions between said local and remote endpoints are performed by said second gatekeeper, and wherein when said local endpoint moves to the location serviced by said third zone of the packet-switched network, communication control functions between said local and remote endpoints are performed by said third gatekeeper.

12. A method according to claim 11, wherein said communication control functions are performed according to the H.245 standard.

13. A method according to claim 1, wherein said communication control functions are performed according to the H.245 standard.

14. A computer program stored on a storage medium readable by a computer for allowing endpoints to move between different zones of a packet-switched network, said computer program when executed causes the computer to perform the steps of:

establishing a communication between local and remote endpoints via a first gatekeeper, which services a first zone of the packet-switched network, when said local endpoint is at a location serviced by said first zone of the packet-switched network; and maintaining communication between said local and remote endpoints via said first gatekeeper and a second gatekeeper, which services a second zone of the packet-switched network, when said local endpoint moves to a location serviced by said second zone of the packet-switched network; and further maintaining communication between said local and remote endpoints via said first gatekeeper and a third gatekeeper, which services a third zone of the packet-switched network, when said local endpoint moves to a location serviced by said third zone of the packet-switched network, wherein said further maintaining comprises handing-off communication control functions from said second gatekeeper to said third gatekeeper, when said local endpoint moves to said third zone of said packet-switched network serviced by said third gatekeeper, relaying, by said first gatekeeper, communications between said remote endpoint and said third gatekeeper, relaying, by said third gatekeeper, communications between said first gatekeeper and said local endpoint; and performing, by said third gatekeeper, communication control functions, previously performed by said second gatekeeper, on communications between said local and remote endpoints.

15. A computer program according to claim 14, wherein said first maintaining step comprises the step of:

handing-off communication control functions from said first gatekeeper to said second gatekeeper, when said local endpoint moves to said second zone of said packet-switched network serviced by said second gatekeeper.

16. A computer program according to claim 15, wherein said first maintaining step further comprises the steps of:

relaying, by said first gatekeeper, communications between said remote endpoint and said second gatekeeper;

relaying, by said second gatekeeper, communications between said first gatekeeper and said local endpoint; and performing, by said second gatekeeper, communication control functions, previously performed by said first gatekeeper, on communications between said local and remote endpoints.

17. A computer program according to claim 14, wherein when said local endpoint is at the location serviced by said first zone of the packet-switched network, communication control functions between said local and remote endpoints are performed by said first gatekeeper, and wherein when said local endpoint moves to the location serviced by said second zone of the packet-switched network, communication control functions between said local and remote endpoints are performed by said second gatekeeper.

18. A computer program according to claim 14, wherein when said local endpoint is at the location serviced by said second zone of the packet-switched network, communication control functions between said local and remote endpoints are performed by said second gatekeeper, and wherein when said local endpoint moves to the location serviced by said third zone of the packet-switched network, communication control functions between said local and remote endpoints are performed by said third gatekeeper.

* * * * *